March 29, 1932.   J. D. BALDWIN, JR   1,851,031
METHOD OF MAKING PIPE COUPLINGS
Filed May 31, 1930
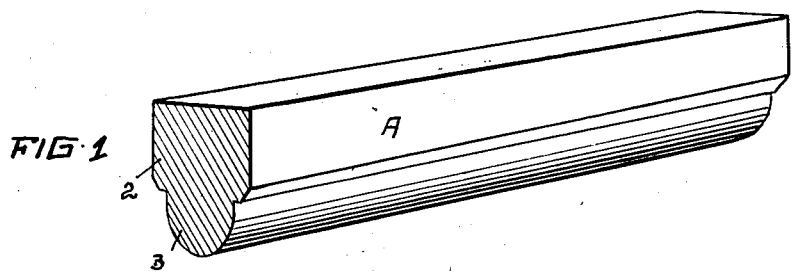
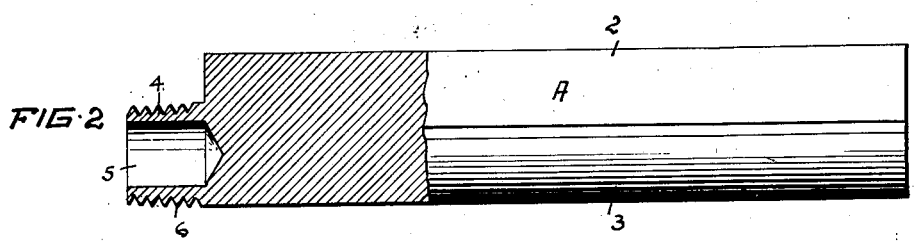
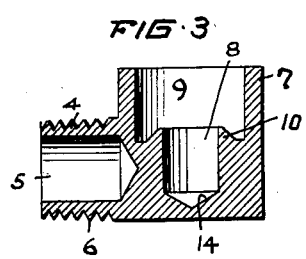 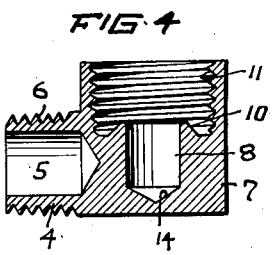 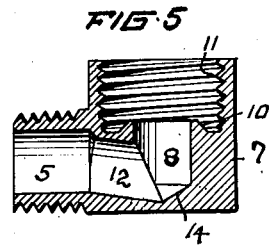
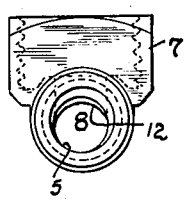 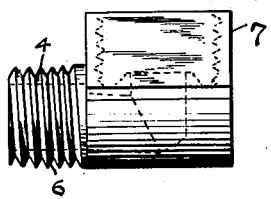 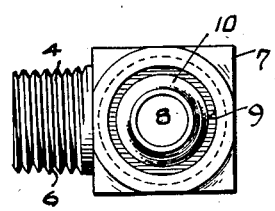
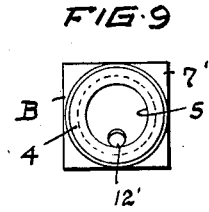 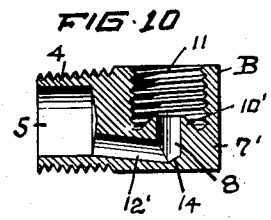 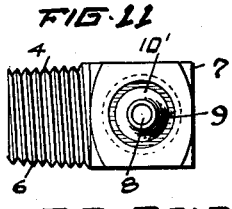
INVENTOR
J. D. BALDWIN JR.
BY Fisher, Moser + Moore
ATTORNEY Patented Mar. 29, 1932

1,851,031

UNITED STATES PATENT OFFICE

JOHN D. BALDWIN, JR., OF CLEVELAND, OHIO, ASSIGNOR TO ALBERT J. WEATHERHEAD, JR., OF CLEVELAND, OHIO

METHOD OF MAKING PIPE COUPLINGS

Application filed May 31, 1930. Serial No. 458,315.

My invention relates to pipe couplings and a method of producing the same, and my aim in general is to produce a very compact and durable pipe coupling rapidly and cheaply from bar or rod stock, especially an angular pipe coupling. Thus the present coupling is particularly designed to permit a flared tube or pipe to be coupled detachably thereto, and the internal construction is such that the coupling may be made relatively small and still permit a tubular nut to be introduced thereinto to connect the tube firmly and tightly therewith. The passage through the coupling body is also made by a series of steps or operations which eventually produce an irregular-shaped angular passage and a conical seat deeply within the body so that one entrance to the passage may be provided with a substantial or adequate number of internal screw-threads adapted to cooperate with the external screw-threads on a tubular nut without stripping the threads on either member or weakening the union between the parts. The coupling is also made in a particular way to provide a fluid passage of graduated angular form to permit a substantial sized stream of fluid to flow freely through the body notwithstanding that the coupling itself is relatively small. In that respect reference may be had to my Patent No. 1,825,042 dated September 29th, 1931.

Referring to the accompanying drawings, Fig. 1 is a perspective view, of a solid rod and Fig. 2 a sectional view and side elevation, of the same rod partially developed into a coupling. Fig. 3 is a sectional view of a coupling body as it appears when severed from the rod and in a further state of development, Fig. 4 a sectional view of the same piece screw-threaded internally, and Fig. 5 a similar view of the completed product. Figs. 6, 7, and 8 are end, side and top views, respectively, of the finished coupling. Figs. 9, 10 and 11, are end, sectional and top views, of a modified form of coupling embodying the invention and made in the same way.

In practicing the method herein described of making pipe couplings, a solid rod or bar A of brass or other suitable metal is introduced into an automatic screw machine and rotated rapidly. The rod is fed through the machine and cut or severed into short sections or pieces, which eventually produce small pipe couplings. Preferably, a part of each coupling is formed before the section or piece is severed from the rod, and a rod of predetermined shape in cross section is also used to promote the making of the couplings with a minimum of machining, waste and expense. Thus, the rod is partly angular and partly semi-circular or round in cross section, the angular portion 2 being relatively wider and larger than the round or semi-circular part 3. The axis of rotation of the rod is in the central region of or co-incident with the axis of the round or semi-circular part 3, and as a result when a cutting tool is applied to one end of the rod while it is rotating a cylindrical extension 4 of reduced diameter will be produced on the rod itself. This extension is drilled axially to provide a round bore or opening 5 approximately its full length, and a screw-thread 6 is cut or rolled externally of the extension during the same proceeding or before a cutting tool is applied to the main body of the rod and severs a given part of the rod carrying the part operated upon, from the main body of the rod. The severance of the piece or part is more or less distant from the base of the extension 4, and preferably a distance about equal to the width of the angular part of the rod or bar so that a substantially square body part 7 is provided at right angles to extension 4. The body part 7 is solid, and the cylindrical extension or branch 4 has drilled opening 5 which extends its full length to the solid part. This partially finished member is then operated on, either in the same automatic screw machine, or in another machine, to produce a complete coupling.

Thus, the square body part 7 is drilled axially through its flat square side to provide a central opening 8 at an abrupt or right angle to the drilled opening 5 in extension 4, and it is also deeply counterbored to provide an enlarged cavity or recess 9 concentric with opening 8. A conical seat 10 is also formed in this drilling and counterboring operation at the entrance to the smaller central opening 8. The conical seat 10 is formed below the plane of the circular outer surface of extension 4, preferably as near the plane of the axis of said extension as possible in order that the coupling may be made small and compact and still possess a relatively deep cavity 9 within which a tubular nut (not shown) may be introduced and secured with tight locking effect without stripping the internal screw-threads 11 in the cavity. Therefore the screw-threads are formed to extend the full length of the cavity to the base thereof beyond the conical seat 10, and the seat itself is formed as deeply as possible within body part 7, taking into consideration the size or diameter of the central passage or opening 8 required for a given coupling. When the requirements are for a coupling having a relatively large fluid passage, the conical seat may still be located deeply within body part 5 without using an overly large bar or rod, providing a communicating passage 12 is drilled in offset relation and preferably at an inclination to the axis of bore 5 in extension 4 and downwardly from the inner end of this bore toward and into the bottom or inner end of opening 8 formed centrally at right angles within conical seat 10. In drilling opening 8 the tapered end of the drill produces a tapering bottom 14 for opening 8, and in drilling passage 12 at an inclination the inner end of this passage is caused to terminate at the axis of the tapering bottom 14 for opening 8, thereby producing a graduated angular passage having no abrupt angular turns or bends, in its main deflecting walls and providing for a free and unobstructed flow for liquid through the coupling.

In Figs. 9 to 11 I show a coupling B made according to the method hereinbefore described excepting that a square bar or rod is used, and in that the fluid passage 12' is of relatively smaller diameter and the conical seat 10' more deeply located within the square or angular part 7' of the coupling than as shown in Fig. 5.

What I claim, is:

1. A method of producing pipe couplings, consisting in forming a screw-threaded cylindrical extension and a longitudinal opening at one end of a section of a solid angular bar; in producing a screw-threaded cavity in one side of said bar section and a conical seat and a central opening at the base of said cavity; and in drilling a communicating passage downwardly at an inclination from the inner end of said longitudinal opening to the bottom of said central opening.

2. A method of producing pipe couplings, consisting in forming a cylindrical extension at one end of a bar of angular shape in cross section; in screw-threading said extension and drilling an opening longitudinally thereof; in drilling a counterbored opening in one side of said bar at right angles to said extension and forming a conical seat deeply within said counterbore; and in drilling an inclined passage between the inner end of the counterbored opening and the inner end of the longitudinal opening in said extension.

3. A method of producing pipe couplings, consisting in forming a screw-threaded extension and a screw-threaded cavity in angular relations in a solid body; in producing a conical seating surface at the bottom of said cavity; in drilling a longitudinal opening in said extension and a central opening through said conical seat; in forming a tapering bottom for said central opening; and in drilling a communicating passage at an inclination from the inner end of said longitudinal opening to the tapering bottom of said central opening.

In testimony whereof I affix my signature.

JOHN D. BALDWIN, Jr.